US007006094B2

(12) United States Patent
Kejser et al.

(10) Patent No.: US 7,006,094 B2
(45) Date of Patent: Feb. 28, 2006

(54) METHOD AND APPARATUS FOR FILLING AN IMAGE ON A DISPLAY SCREEN

(75) Inventors: Keith Kejser, New Westminster (CA); Doug McFadyen, Delta (CA)

(73) Assignee: Seiko Epson Corporation, Tokyo (JP)

( * ) Notice: Subject to any disclaimer, the term of this patent is extended or adjusted under 35 U.S.C. 154(b) by 423 days.

(21) Appl. No.: 10/128,905

(22) Filed: Apr. 24, 2002

(65) Prior Publication Data

US 2003/0206168 A1  Nov. 6, 2003

(51) Int. Cl.
*G06T 11/20* (2006.01)

(52) U.S. Cl. .................................. 345/441; 178/18.01
(58) Field of Classification Search .................. 345/441
See application file for complete search history.

(56) References Cited

U.S. PATENT DOCUMENTS

| | | | |
|---|---|---|---|
| 4,745,575 A | 5/1988 | Hawes .......................... 364/900 |
| 4,758,965 A | 7/1988 | Liang et al. .................. 364/518 |
| 4,849,910 A | 7/1989 | Jacobs et al. ................ 364/519 |
| 4,855,935 A | 8/1989 | Lien et al. .................... 364/521 |
| 5,073,960 A | 12/1991 | Nakai et al. .................. 382/22 |
| 5,095,520 A | 3/1992 | Kim .............................. 395/101 |
| 5,278,949 A | 1/1994 | Thayer ......................... 395/126 |
| 5,282,269 A | * 1/1994 | Willems et al. ............. 345/545 |
| 5,309,553 A | 5/1994 | Mukai et al. ................. 395/143 |
| 5,463,723 A | 10/1995 | Saha ............................ 395/134 |
| 5,579,461 A | 11/1996 | Saha ............................ 395/134 |
| 5,673,379 A | 9/1997 | Diehl ........................... 395/141 |
| 5,721,885 A | 2/1998 | Nishide ....................... 395/525 |
| 5,847,715 A | 12/1998 | Fujita et al. .................. 345/443 |
| 5,872,553 A | 2/1999 | Strickling, III .............. 345/133 |
| 5,923,341 A | * 7/1999 | Martin ......................... 345/561 |
| 5,969,699 A | 10/1999 | Balram et al. ................ 345/10 |
| 2002/0063696 A1 | * 5/2002 | Kubo et al. .................. 345/173 |
| 2003/0024748 A1 | * 2/2003 | Dresevic et al. ............ 178/18.01 |

OTHER PUBLICATIONS

Louis Ibanez, et al., "A Vectorial Algorithm for Tracing Discrete Straight Lines in N–Dimensional Generalized Grids", IEEE Transactions on Visualization and Computer Graphics, vol. 7, No. 2, Apr.–Jun. 2001, pp. 97–108.

Jack Bresenham, "Something Old, New, Borrowed, and Blue", IEEE Computer Graphics and Applications, Sep. 1990, pp. 42–44.

Curtis R. Priem, "Developing the GX Graphics Accelerator Architecture", IEEE Micro, Feb. 1990, pp. 44–54.

* cited by examiner

*Primary Examiner*—Michael Razavi
*Assistant Examiner*—Hwa C. Lee (57) ABSTRACT

An apparatus for efficiently filling an image on a display screen through hardware acceleration are provided. One exemplary device includes a display controller. The display controller includes image generation circuitry configured to generate an address and a color for each pixel of an image to be drawn on a display screen. The image generation circuitry includes pen width selection circuitry configured to identify and select coordinates of adjacent and non-overlapping sectors to an initial footprint of the image on the display screen to be drawn. The display controller includes data processing and selection circuitry configured to interface with a central processing unit (CPU) and a memory. The data processing and selection circuitry in communication with the image generation circuitry and configured to receive the address and the color for each pixel of the image. A system and methods for filling an image on a display screen are also provided.

32 Claims, 6 Drawing Sheets

METHOD AND APPARATUS FOR FILLING AN IMAGE ON A DISPLAY SCREEN

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to computer graphics systems and more particularly to a method and apparatus to more efficiently display and fill a computer generated image on a display screen.

2. Description of the Related Art

The images presented on display screens for portable consumer electronics are becoming more complex to achieve a higher quality image partly in response to the consumer demand for these handheld devices. Devices such as personal digital assistants (PDA), mobile phones, pagers, web tablets, etc., all include small screens for displaying text and graphics. The presentation of the text and graphics on the screen requires that image lines having a certain width, also referred to as a pen width, be accommodated. These image lines, which can be straight or curved, are displayed on a screen, such as a liquid crystal display (LCD) screen, by defining which pixels are drawn. As the files being displayed on the screens become more complex with a higher resolution, the increased processing demands on the embedded systems of the handheld devices causes a bottleneck, which in turn, may delay the presentation of the graphical image on the display screen. Additionally, the embedded systems for controlling these handheld devices are limited in terms of memory and computing power due to their compact nature, which further aggravates the bottleneck.

Figure 1:
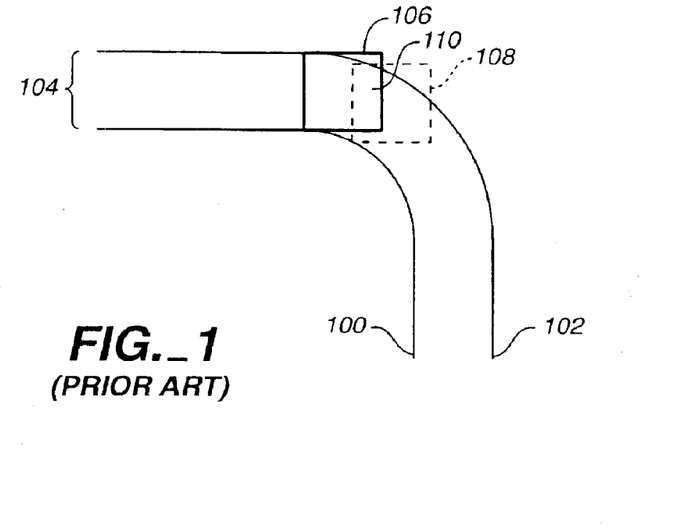
FIG. 1 is an enlarged schematic diagram of a computer generated curve being drawn for a display on a computer screen.

FIG. 1 is an enlarged schematic diagram of a computer generated curve being drawn for a display on a computer screen, such as a LCD screen. The curve is defined between lines 100 and 102, which provide the borders between which the image is filled. Pen width 104 is defined as the distance between lines 100 and 102. Region 106 corresponds to an area on a display screen that defines a group of pixels. The group of pixels corresponding to region 106 is filled as the image is drawn on a display screen. Once the area defined by region 106 is filled, the footprint is advanced one unit along line 100, to define another group of pixels to be filled. The group of pixels corresponding to region 108, which is defined by the footprint as it is advanced one unit, is then drawn. However, region 110, which is the overlap of regions 106 and 108, is drawn twice in this process. That is, region 110, is written once as defined by region 106 and is overwritten as defined by region 108, resulting in wasted processing time. This overwriting process is repeated until the entire graphic is drawn.

Another shortcoming of executing the algorithm for displaying an image in software as described above, is the amount of overhead associated with execution of the algorithm. Thus, the inefficient processing from the overwriting of previously drawn pixels mentioned above, comes at a high cost in terms of overhead. Furthermore, the handheld devices are constantly shrinking and being configured to consume less power. Since, the embedded systems controlling these devices is limited in terms of computing power, there is a need to minimize overhead. As products having increased resolution and capabilities for displaying complex graphical images come to market, the processing bottlenecks must be addressed in order to efficiently display the images without sacrificing the quality of the display.

As a result, there is a need to solve the problems of the prior art to provide a method for efficiently processing computer generated graphical image data for display and to a hardware acceleration solution to minimize the overhead associated with the software execution.

SUMMARY OF THE INVENTION

Broadly speaking, the present invention fills these needs by providing a method and system for more efficiently displaying a computer generated image on a display screen. It should be appreciated that the present invention can be implemented in numerous ways, including as a process, a system, or a device. Several inventive embodiments of the present invention are described below.

In one embodiment, a display controller is provided. The display controller includes image generation circuitry configured to generate an address and a color for each pixel of an image to be drawn on a display screen. The image generation circuitry includes pen width selection circuitry configured to identify and select coordinates of adjacent and non-overlapping sectors to an initial footprint of the image on the display screen to be drawn. Data processing and selection circuitry configured to interface with a central processing unit (CPU) and a memory is also included in the display controller. The data processing and selection circuitry is in communication with the image generation circuitry and is configured to receive the address and the color for each pixel of the image.

In another embodiment, a device configured to draw an image is provided. The device includes a central processing unit (CPU) and a random access memory (RAM). Drawing engine circuitry in communication with the CPU and the RAM is included. The drawing engine circuitry includes data processing and selection circuitry and image generation circuitry. The image generation circuitry is in communication with the data processing and selection circuitry. The image generation circuitry includes pen width selection circuitry that enables the efficient display of an image by defining adjacent, non-overlapping successive sectors used to generate the image.

In yet another embodiment, a method for drawing a computer generated image on a display screen is provided. The method initiates with defining a footprint region corresponding to a first group of pixels. Then, the first group of pixels is filled. Next, a direction of movement is determined for an image to be presented on a display screen. Then, a location for an adjacent and non-overlapping sector to the footprint region is calculated. Next, a second group of pixels corresponding to the adjacent and non-overlapping sector to the footprint region is filled.

In still yet another embodiment, a method for filling a computer generated image on a display screen having defined starting coordinates is provided. The method initiates with defining a footprint having a reference point. Then, a footprint region on a display screen is identified. The footprint region is defined by the footprint when the reference point corresponds to starting coordinates of an image. Next, pixels associated with the footprint region are filled. Then, a location for a sector that is adjacent to and non-overlapping with the footprint region is calculated. Next, pixels associated with the adjacent sector are filled. Then, the operations of calculating a location and filling pixels associated with the adjacent sector are repeated for successive sectors to define the image.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for efficiently displaying an image on a computer screen. It will be apparent, however, to one skilled in the art, in light of the following description, that the present invention may be practiced without some or all of these specific details. In other instances, well known process operations have not been described in detail in order not to unnecessarily obscure the present invention.

The embodiments of the present invention provide a method and apparatus for creating a computer generated image for display. Inefficiencies, with respect to overwriting previously written pixels, when drawing and filling a line or curve are eliminated. Additionally, a hardware acceleration implementation is provided in order to minimize overhead. The Bresenham Circle Algorithm (BCA) is an algorithm employed when drawing a curved line, also referred to as an arc. The BCA works on the principle of splitting a circle into eight octants. The curve is calculated for one octant and then by adding or subtracting the x or y coordinate for the calculated octant, the curve can be replicated in each of the remaining octants.

Figure 2:
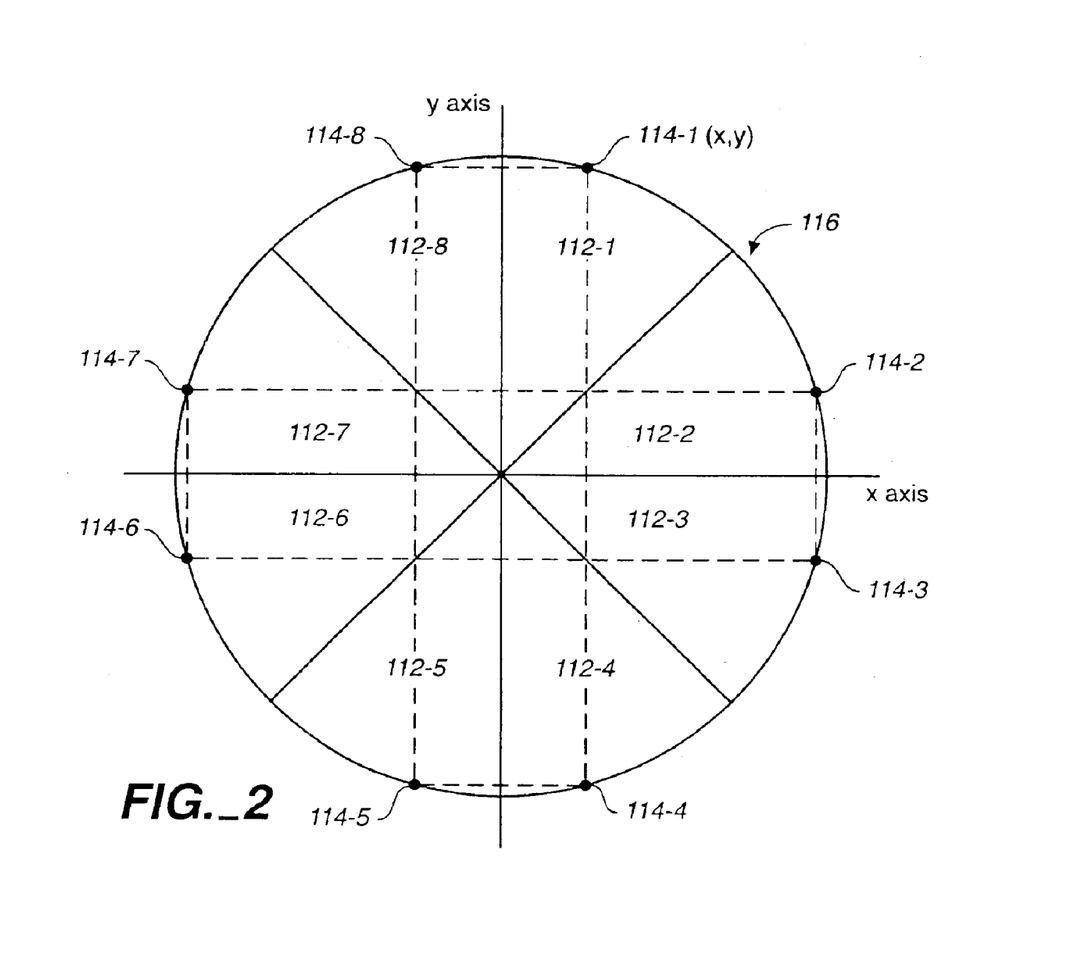
FIG. 2 is a schematic diagram illustrating the symmetric octants of a circle and their relation to the Bresenham Circle Algorithm (BCA).

FIG. 2 is a schematic diagram illustrating the symmetric octants of a circle and their relation to the BCA. The BCA calculates the locations of the points, i.e., pixels, in the first 45 degree octant, and due to the symmetrical nature of circle 116, each calculated point in one of the octants of the circle can be reflected around each 45 degree axis of the circle. For example, the coordinates (x, y) for point 114-1 of octant 112-1 are calculated. Due to the symmetry of the circle, the coordinates for points 114-2 through 114-8 of octants 112-2 through 112-8, respectively, can be determined as illustrated in Table 1 below.

TABLE 1

| Point | Coordinates |
|---|---|
| 114-1 | (x, y) |
| 114-2 | (y, x) |
| 114-3 | (y, −x) |
| 114-4 | (x, −y) |
| 114-5 | (−x, −y) |
| 114-6 | (−y, −x) |
| 114-7 | (−y, x) |
| 114-8 | (−x, y) |

The BCA allows for a curve to be generated without regard to the octant in which the curve resides because of the symmetrical nature of a circle. That is, a curve calculated in octant 112-1 can be replicated in each of the seven remaining octants 112-2 through 112-8 by adding or subtracting to the x or y coordinates in octant 112-1.

Figure 3A:
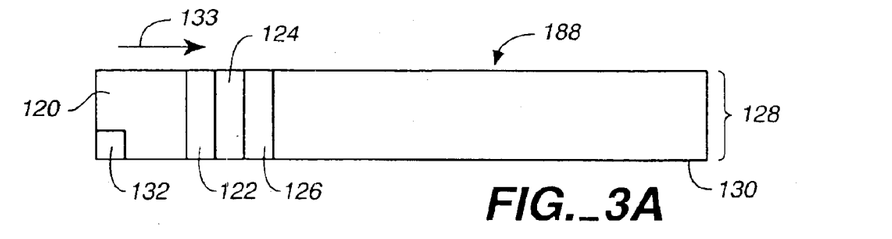
FIG. 3A is a schematic diagram representing a process for filling a line on a display screen in accordance with one embodiment of the invention.

FIG. 3A is a schematic diagram representing a process for filling a line on a display screen in accordance with one embodiment of the invention. Line 118 defines a pen width 128. Region 120 is defined by an initial footprint having dimensions equal to pen width 128. That is, the length and width of region 120 is equal to pen width 128. For illustrative purposes, the pen width of line 118 is equal to 3. It should be appreciated by one skilled in the art that any line or curve generated on a computer display having a pen width greater than 2 will have to be filled. In one embodiment, the initial footprint defining region 120 includes a reference point within the region. For exemplary purposes, the initial footprint defining region 120 will use the lower left hand point 132 as a reference point as long as the reference point is consistently used for each successive sector. One skilled in the art will appreciate that any point within region 120 defined by the footprint can be used as a reference point. Thus, when drawing line 118 on a computer display, reference point 132 of region 120 is located on lower line 130 such that the reference point corresponds to a point on the lower line, which in turn represents a pixel on a display screen. Accordingly, the footprint is positioned to define region 120 such that reference point 132 corresponds to a point on outline 130. It should be appreciated that region 120 correlates to a group of pixels to be filled on a display screen to present an image. In one embodiment, the image is an outline of a rounded rectangle. For example, the letter "o" displayed on a display screen is an example of an outline of a rounded rectangle. Any portable device having a display screen configured to display text, including numbers, will define arcs and lines that must be filled. Thus, these portable devices can utilize the apparatus and method defined herein.

Still referring to FIG. 3A, the pixels corresponding to region 120 are filled to define a portion of line 118. Here, as pen width 128 is 3, i.e., 3 pixels, region 120 represents 9 pixels to be filled. The coordinates of the footprint defining region 120 on line 118 are known, as well as the coordinates of the reference point on lower line 130. Therefore, the coordinates, i.e., pixels, defined within region 120 can be ascertained in order to fill the pixels. Rather than advancing the footprint one unit along outline 130 of line 118, the coordinates for an adjacent, non-overlapping sector to region 120 are calculated. That is, instead of the entire footprint advancing one pen width, i.e., one pixel, at a time to draw line 118, the next sector to be filled can be calculated when a direction of movement is known, as discussed in more detail with respect to FIGS. 5A and 5B. Hence, sector 122, which is adjacent and non-overlapping to footprint 120, is calculated to define the next set of pixels to be filled for line 118. In one embodiment, the direction of movement as indicated by arrow 133 is from left to right, as this is the manner in which the image data is written into memory. It should be appreciated that for a straight line the direction of movement can also be scanned in a right to left direction. Sectors 124 and 126 are similarly calculated. It should be appreciated that this process will be continued until the entire region defined by line 118 on a display screen is completely filled in. It will be apparent to one skilled in the art that the coordinates for a starting point for line 118 on a display screen, such as a liquid crystal display (LCD) screen, is supplied by a central processing unit (CPU) writing the start location to registers in hardware.

Figure 3B:
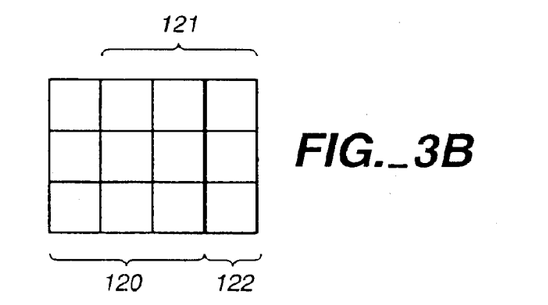
FIG. 3B is an enlarged schematic diagram of the pixels represented by region 120 and sector 122 of FIG. 3A.

FIG. 3B is an enlarged schematic diagram of the pixels represented by region 120 and sector 122 of FIG. 3A. As stated above, region 120 has a pen width equal to 3 that is, 3 pixels. Thus, 9 pixels are defined by region 120 as the footprint's dimensions are defined by the pen width. Sector 122 defines 3 pixels which are adjacent to region 120. The efficiencies gained by calculating the location of sector 122 rather than advancing the entire footprint, are fairly significant. That is, sector 122 defines only pixels that have not been filled in yet. Thus, the process described in reference to FIG. 3A is three times faster (9 divided by 3) than the process of advancing the footprint by one unit. In particular, when the footprint is advanced one unit along lower line 130 according to a pen moving algorithm, another complete set of 9 pixels is defined as represented by region 121. The 9 pixels of region 121 are then filled. However, this results in the redrawing of 6 pixels which had previously been drawn with reference to region 120. By calculating the location of sector 122, 3 pixels that have not been previously drawn are filled in, as opposed to 9 pixels defined by region 121 when the footprint is advanced one pen width at a time. Thus, the speed at which 3 pixels defined by region 122 are drawn is three times as fast as the speed of drawing the 9 pixels defined by region 121. FIGS. 3A and 3B refer to a pen width of 3 for exemplary purposes only, however, it should be appreciated that the pen width can be any number of pixels suitable for displaying an image on a display screen.

Figure 4A:
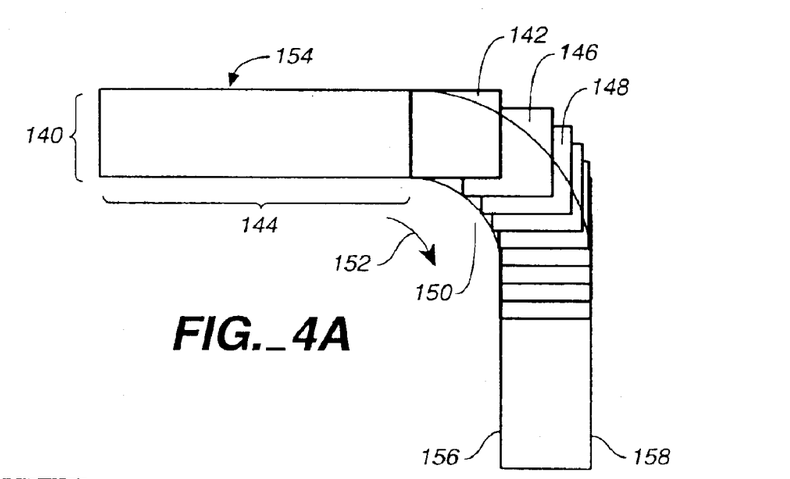
FIG. 4A is a schematic diagram illustrating a process for filling a curve of a computer generated display in accordance with one embodiment of the invention.

FIG. 4A is a schematic diagram illustrating a process for filling a curve of a computer generated display in accordance with one embodiment of the invention. Curve 154 is defined between lower outline 156 and upper outline 158. Curve 154 defines a pen width 140. For exemplary purposes, pen width 140 is equal to 5, i.e., 5 pixels. Thus, the footprint is defined by a length and a width equal to pen width 140. It should be appreciated that region 144 is a straight line and thus, could be filled according to the process described with reference to FIGS. 3A and 3B. For illustrative purposes, the curve of FIG. 4A is discussed with region 142 being a starting point. The initial footprint defines region 142 and includes a reference point which corresponds to the lower left hand corner of the footprint. The reference point of the footprint corresponds to a point on lower outline 156. Therefore, region 142 correlates to a group of pixels to be filled for displaying a portion of curve 154 when the reference point corresponds to a point on lower outline 156. Similar to FIG. 3, the coordinates of the point on outline 156 are known, as well as the dimensions of the footprint. Therefore, each coordinate defined within region 142 is also known. In one embodiment, the direction of movement, as indicated by arrow 152, is based on the BCA. It will be apparent to one skilled in the art that for octant 1, in reference to the BCA, the direction of movement is from left to right and from the top down and all remaining octants are calculated based on the values for octant 1. Thus, the next region of pixels to be filled as represented by sector 146, can be calculated. These calculations can be repeated for successive points on outline 156 to result in sectors 148, 150 and so on, being defined and filled.

It should be appreciated that while FIG. 4A illustrates a curve being generated, the process for filling a curve can be applied to any suitable shape having a curve. In particular, the process can be performed to display a rounded rectangle. Furthermore, once one of the rounded edges of a rounded rectangle is drawn, the coordinates for the pixels defining the remaining rounded edges can be calculated and filled by utilizing the Bresenham Circle Algorithm discussed above. Additionally, text and graphics containing a straight line or a curve can apply the process for calculating adjacent, non-overlapping regions to be filled based upon a direction of movement.

Figure 4B:
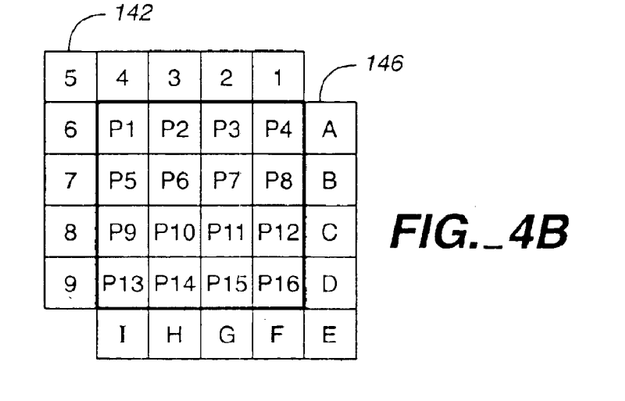
FIG. 4B is an enlarged schematic diagram of the pixels represented by sector 146 and region 142 of FIG. 4A.

FIG. 4B is an enlarged schematic diagram of the pixels represented by sector 146 and region 142 of FIG. 4A. Sector 146 corresponds to pixels A–I of FIG. 4A. The remaining pixels of FIG. 4B, i.e., 1–9 and P1–P16, represent the pixels defined by region 142 of FIG. 4A. As the locations of pixels A through I are calculated, it is unnecessary to define the entire footprint and overwrite pixels that have already been drawn. Pixels P1 to P16 were previously drawn by region 142 of FIG. 4A. Thus, by calculating the coordinates of sector 146, 9 pixels are drawn rather than 25 pixels, which results in a significant processing efficiency through the elimination of the redrawing of pixels P1 to P16. This process is approximately 2.78 times (25 divided by 9) faster than the technique of redrawing previously drawn pixels.

Figure 5A:
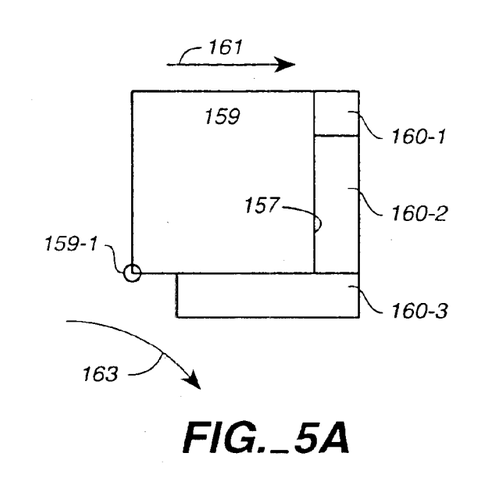
FIG. 5A is a schematic diagram illustrating one possible location for the adjacent non-overlapping sectors defined when drawing an image on a display screen in accordance with one embodiment of the invention.

FIG. 5A is a schematic diagram illustrating one possible location for the adjacent non-overlapping sectors defined when drawing an image on a display screen in accordance with one embodiment of the invention. Region 159 represents the region defined by the initial footprint such as region 120 of FIG. 3A and region 142 of FIG. 4A. For the situation where the direction of movement is one over, i.e., one unit over on the x axis, as indicated by directional arrow 161, sector 160-1 and sector 160-2 are drawn and filled. The location of sectors 160-1 and 160-2 can be calculated since the x coordinate for the points of line 157 is the x coordinate of reference point 159-1 plus the pen width of region 159. Thus, the x coordinates for the lower left hand corner of sector 160-1 and sector 160-2 can be determined. The width for sectors 160-1 and 160-2 is one pixel, i.e., one pen width. Therefore, the dimensions for sectors 160-1 and 160-2 can be stored, which allows the pixels corresponding to sectors 160-1 and 160-2 to be identified. When moving according to directional arrow 161, the pixels corresponding to sectors 160-1 and 160-2 are drawn. It should be appreciated that the above described process for determining the location of sectors 160-1 and 160-2 allows for the drawing of a line moving in a direction as discussed with reference to FIGS. 3A and 3B.

Still referring to FIG. 5A, where movement is according to directional arrow 163, one pixel over and one pixel down, in other words, one unit over on the x axis and one unit down on the y axis, the pixels corresponding to sectors 160-2 and 160-3 are drawn. Since the x coordinate for sector 160-3 is one pen width over from the x coordinate of reference point 159-1 and the y coordinate is the y coordinate of reference point 159-1 minus one pixel length, the x and y coordinates of the lower left hand corner of sector 160-3 can be calculated. As mentioned above, the dimensions of sector 160-3 are stored in memory in one embodiment. Sectors 160-2 and 160-3 are drawn when moving one pixel over and one pixel down. A location for sector 160-2 is calculated as discussed above. It should be appreciated that sector 160-2 is calculated and filled irrespective of the direction of movement. Thus, by calculating the coordinates of the lower left hand corners of sectors 160-1 through 160-3 and using the calculated coordinates in conjunction with the stored dimensions of sectors 160-1 through 160-3, the pixels corresponding to sectors 160-1 through 160-3 are identified. Depending on a direction of movement, the pixels corresponding to sectors 160-1 or 160-3 are drawn along with the pixels corresponding to sector 160-2. Consequently, the overwriting of previously drawn pixels is eliminated. One skilled in the art will appreciate that by applying the BCA to the process described herein, once the points in the first octant are calculated, the points on the circle for any other octant can be calculated by adding and subtracting the x and y coordinates as discussed with respect to FIG. 2.

Figure 5B:
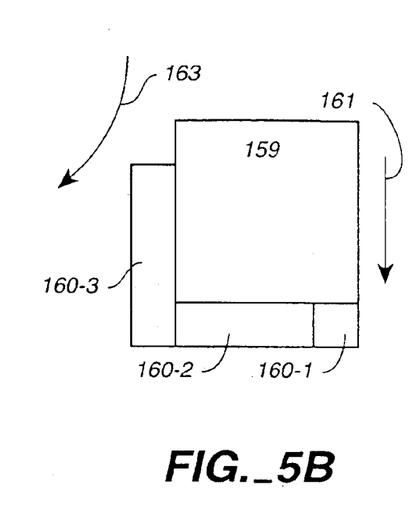
FIG. 5B is a schematic diagram illustrating an alternative location for the adjacent non-overlapping sectors of FIG. 5A due to an alternative direction of movement.

FIG. 5B is a schematic diagram illustrating an alternative location for the adjacent non-overlapping sectors of FIG. 5A due to an alternative direction of movement. It should be appreciated that FIG. 5B is a 90 degree rotation of FIG. 5A. Thus, sectors 160-1 and 160-2 are drawn for a line moving in a downward direction, i.e., the y coordinate is decreasing. Sectors 160-2 and 160-3 are drawn for a curve proceeding as depicted by arrow 163. As mentioned above, the image represented by FIG. 5B can be displayed by applying the BCA to the image of FIG. 5A. That is, the curve of FIG. 5B occupies a different octant than the curve of FIG. 5A, however, by adding and subtracting x and y coordinates, the coordinates for the curve of FIG. 5B can be ascertained through the BCA. It should be appreciated that curves defined by FIGS. 5A and 5B may be rotated in 90 degree increments through the application of the BCA, thereby allowing for 360 degree directionality. That is, a curve can be defined by any one of the octants of a circle, such as the circle of FIG. 2 through the application of the BCA.

Figure 6:
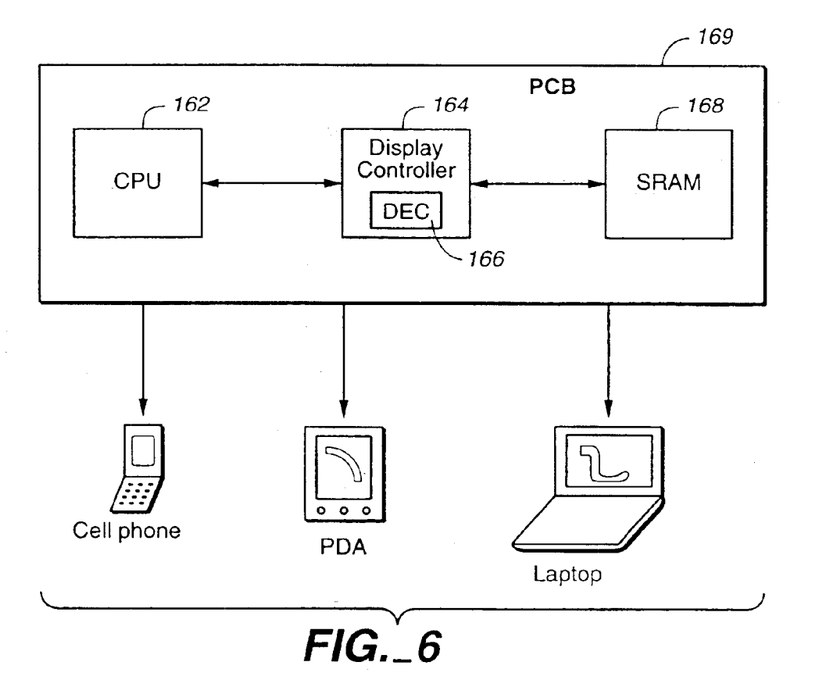
FIG. 6 is a high level schematic diagram of a printed circuit board for filling in a computer generated image on a display screen in accordance with one embodiment of the invention, the printed circuit board interfacing with (i) a mobile phone having a display screen capable of efficiently displaying an image through the components on the printed circuit board, (ii) a personal digital assistant having a display screen capable of efficiently displaying an image through the components on the printed circuit board, and (iii) a laptop computer having a display screen capable of efficiently displaying an image through the components on the printed circuit board.

FIG. 6A is a high level schematic diagram of a printed circuit board for filling in a computer generated image on a display screen in accordance with one embodiment of the invention. Printed circuit board (PCB) 169 includes central processing unit (CPU) 162, display controller 164 and static random access memory (SRAM) 168. CPU 162 is in communication with display controller 164. Display controller 164 is in communication with SRAM 168. In one embodiment, display controller 164 is a liquid crystal display (LCD) controller that enables the presentation of a computer generated image on a LCD screen. Of course, an image stored in SRAM 168 can be displayed on a display screen that is in communication with the SRAM. Drawing engine circuitry (DEC) 166 is defined within display controller 164. Drawing engine circuitry 166 includes circuitry configured to incrementally fill in the regions of a line or a curve without overlapping any previously drawn regions or sectors, as mentioned above in reference to FIGS. 3A, 3B, 4A and 4B.

The printed circuit board of FIG. 6 may be included in a portable electronic device such as a personal digital assistant, mobile phone, web tablet, etc. For example, the printed circuit board may interface with a mobile phone having PCB 169 that enables a display screen of the mobile phone to display an image as described with respect to FIGS. 3A, 3B, 4A and 4B, or a PDA or laptop, each having PCB 169 to enable the efficient display of an image on a display screen for that device. It should be appreciated that in one embodiment of the invention, the code of Table 2 below can be stored in memory, such as a flash memory of each device. The flash memory would be in communication with CPU 162 of FIG. 6. CPU 162 can then store the code in cache and execute the code. In one embodiment, PCB 169 is part of an embedded system for a handheld device.

Figure 7:
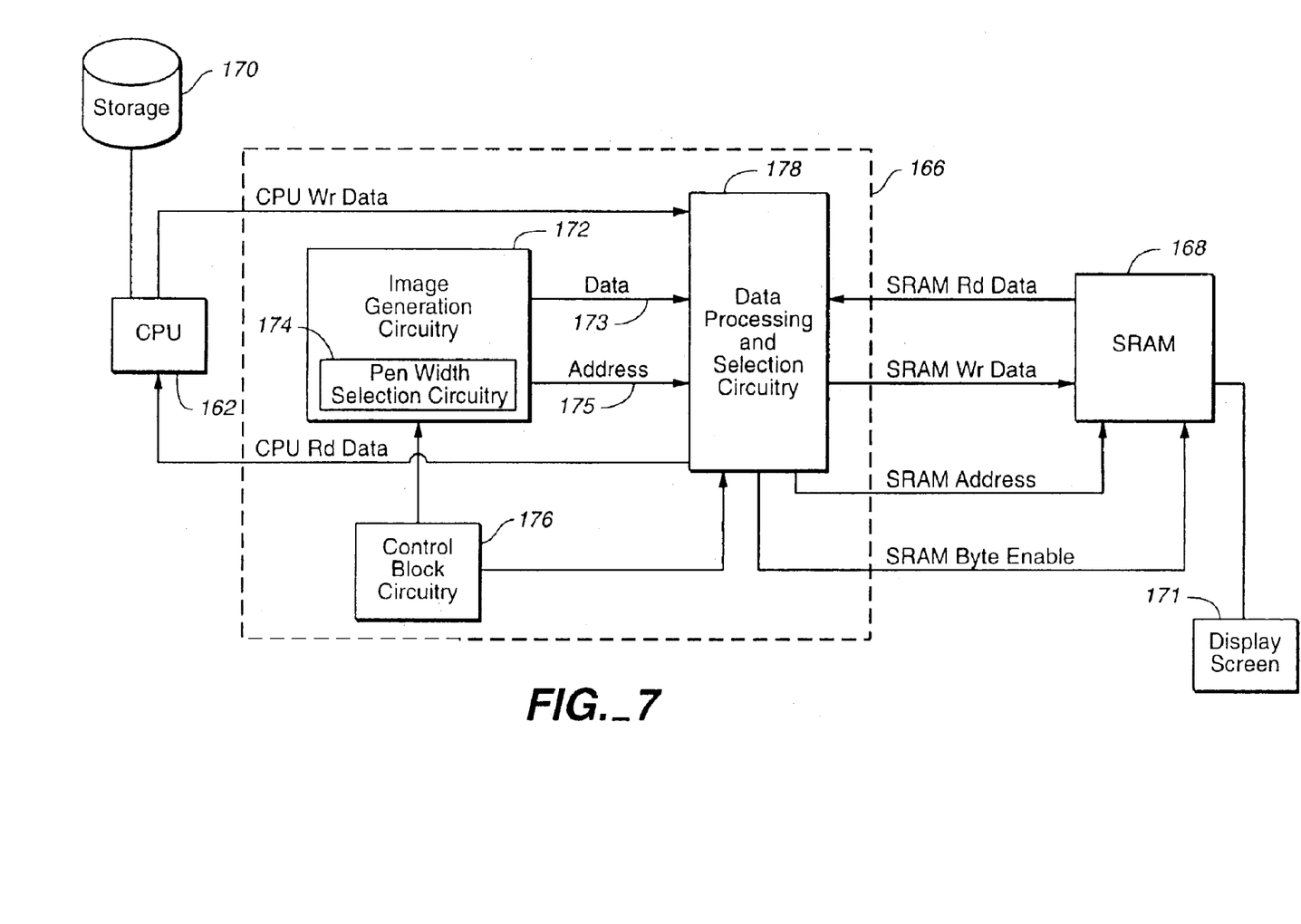
FIG. 7 is a more detailed schematic diagram of the drawing engine circuitry in accordance with one embodiment of the invention.

FIG. 7 is a more detailed schematic diagram of the drawing engine circuitry in accordance with one embodiment of the invention. Drawing engine circuitry 166 includes image generation circuitry 172, data processing and selection circuitry 178, and control block circuitry 176. Drawing engine circuitry 166 is configured to interface with central processing unit (CPU) 162 and static random access memory (SRAM) 168. SRAM 168 is in communication with display screen 171. In one embodiment, display screen 171 is a liquid crystal display (LCD) screen. CPU 162 is in communication with storage media 170 and is configured to issue write data to data processing and selection circuitry 178. CPU write data includes the coordinates for a starting location of an image to be drawn on a display screen. CPU write data is converted and aligned by data processing and selection circuitry 178 as will be explained in more detail with reference to FIG. 8. Image generation circuitry 172, outputs a color for each pixel to be drawn as represented by data 173, and a physical address 175 in memory of where each pixel to be drawn is duplicated. Image generation circuitry 172 includes pen width selection circuitry 174. Pen width selection circuitry 174 is configured to select a pen width for each region of an image to be drawn on a display screen. For example, with respect to FIGS. 3A, 3B, 4A and 4B, the pen width selection circuitry 174 provides a pen width for the footprint, and each successive adjacent non-overlapping sector from the footprint region as the image is drawn.

It will be apparent to one skilled in the art that image generation circuitry 172 and pen width selection circuitry 174 of FIG. 7 include counters, comparators, adders, subtractors and logic gates fabricated on semiconductor chips and configured to accomplish the mathematical operations required to draw a line or a curve on a display screen. Because the Bresenham circle algorithm is employed to locate coordinates for the pixels, complex mathematical computations such as squares, square roots, sign and co-sign functions are avoided. Thus, the circuitry within image generation circuitry 172 can be smaller and configured to more rapidly generate the image. In one embodiment, image generation circuitry 172 is configured to execute the code supplied in Table 2 for drawing an image on a display screen as discussed with reference to FIGS. 5A and 5B. Accordingly, each successive sector drawn on the display screen will be adjacent to a prior drawn sector without overlapping. That is, the address of each pixel is not written then overwritten, thereby avoiding a significant processing inefficiency for drawing an image on a display screen. Control block circuitry 176 is configured to manage signals between data processing and selection circuitry 178 and image generation circuitry 172.

Figure 8:
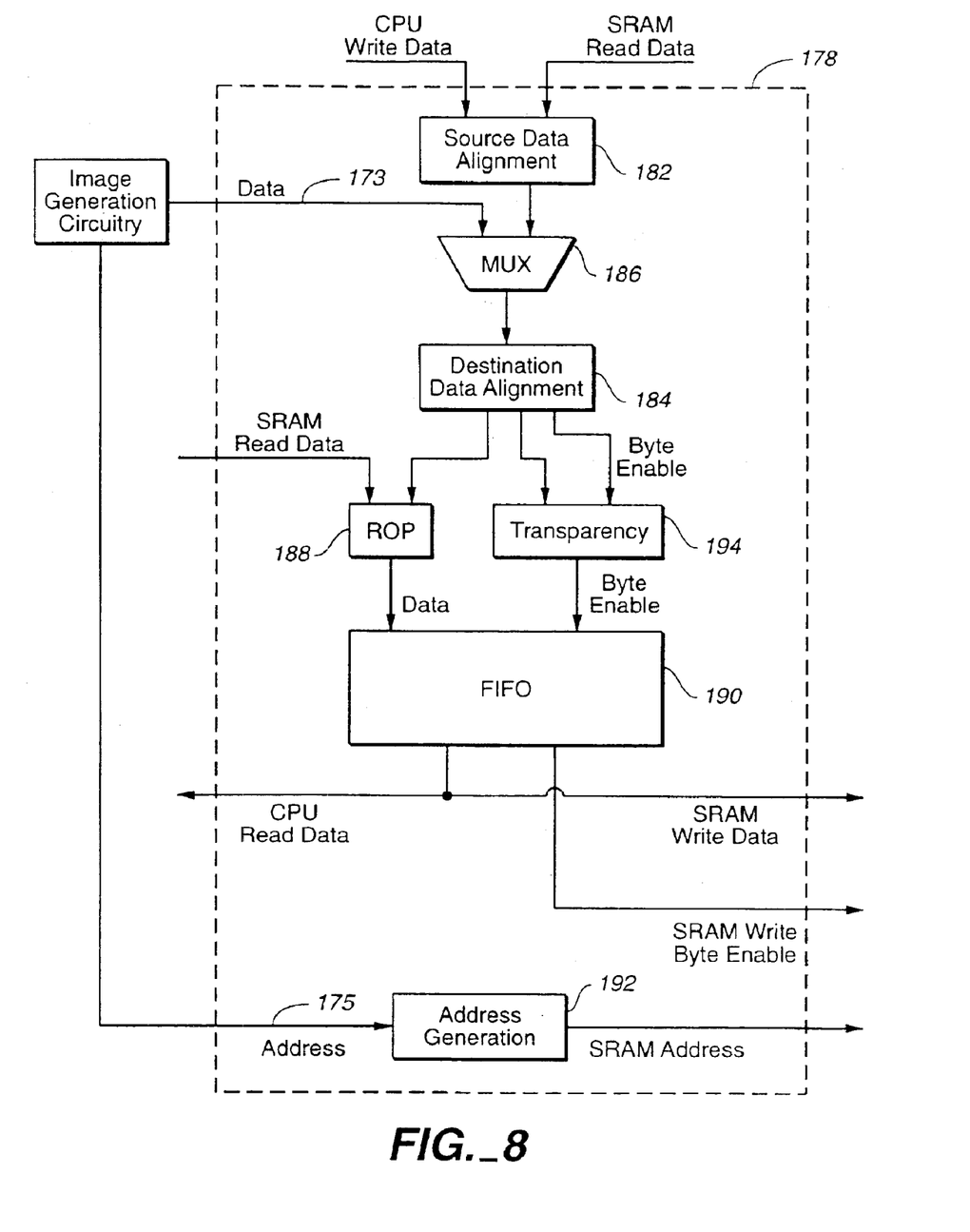
FIG. 8 is a more detailed schematic diagram of the data processing and selection circuitry in accordance with one embodiment of the invention.

FIG. 8 is a more detailed schematic diagram of the data processing and selection circuitry in accordance with one embodiment of the invention. Data processing and selection circuitry 178 is configured to receive CPU write data and SRAM read data. Source data alignment circuitry 182 aligns source data from any byte aligned address to a double word (32) bit address. Source data alignment circuitry 182 outputs source read data to multiplexor 186. Data 173, i.e., the color of each pixel, from image generation circuitry 172, is multiplexed with the source read data into multiplexor 186, where the multiplexor selects the source of the data to use. That is, either the data from source data alignment circuitry 182 or data 173 from image generation circuitry 172 is selected. The selected data from multiplexor 186 is output to destination data alignment circuitry 184. Destination data alignment circuitry 184 aligns the data from the double word to the byte address in the SRAM. Destination data alignment circuitry 184 outputs data to raster operation (ROP) code circuitry 188 and byte enable data to transparency circuitry 194. It will be apparent to one skilled in the art that raster operation code circuitry 188 allows data to be read from a destination before writing to it. For example, ROP code circuitry 188 enables the feature of changing an icon's color on a display screen as it is clicked on or dragged. Transparency circuitry 194 compares the data with a transparent color and determines whether the data is written or not. Raster operation code 188 outputs raster operation result data to first in first out (FIFO) buffer 190. FIFO buffer 190 is a buffer where data and byte enables can reside until a memory controller is free. When the memory controller is free, the data can be written into memory. For example, for a 32 bit write, byte enable FIFO 194 defines which 8 bits of the 32 bits of data to write into memory in one embodiment. One skilled in the art will appreciate that data in FIFO buffer 190 can be read by a CPU. Address generation circuitry 192 is configured to receive address data 175 for pixels to be drawn on the display screen in order to display the image. Address generation circuitry 192 outputs the pixel addresses to an SRAM address.

Figure 9:
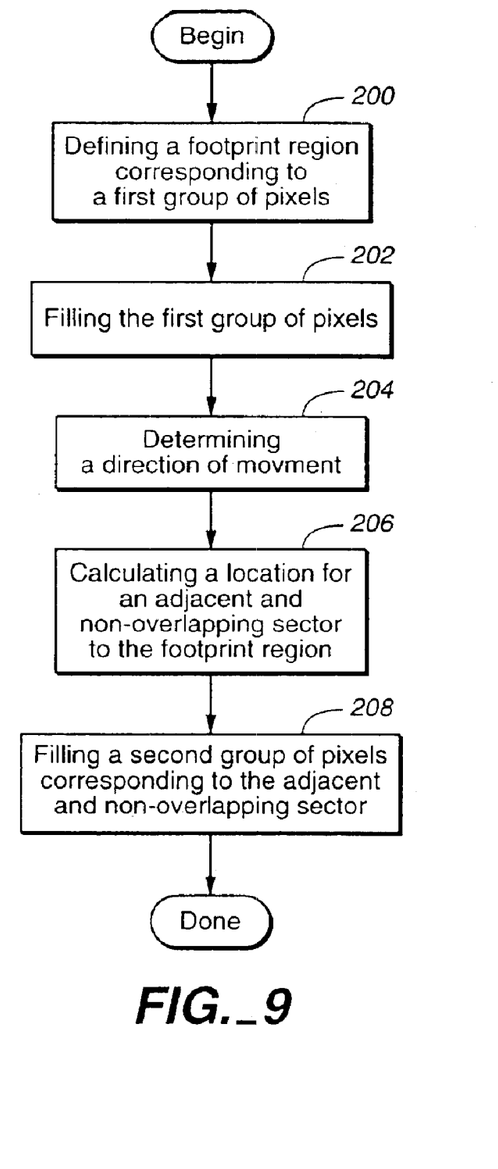
FIG. 9 is a flowchart diagram of the method operations for drawing a computer image on a display screen in accordance with one embodiment of the invention.

FIG. 9 is a flowchart diagram of the method operations for drawing a computer image on a display screen in accordance with one embodiment of the invention. The flowchart initiates with operation 200 where an initial footprint region corresponding to a first group of pixels is defined. The initial footprint region has dimensions defined by a pen width. In one embodiment, the pen width is greater than 2. The method then advances to operation 202 where the first group of pixels is filled. As mentioned above, the address and the color for each pixel is supplied by pen width selection circuitry of a display controller, such as a LCD controller.

The method then moves to operation 204 where a direction of movement is determined. The direction of movement as discussed with respect to FIGS. 3A, 3B, 4A, 4B, 5A and 5B is determined here. In one embodiment, the direction of movement is determined based on the BCA. The method then proceeds to operation 206 where a location for an adjacent and non-overlapping sector to the initial footprint region is calculated. With reference to FIGS. 5A and 5B, the location of sectors 160-1 through 160-3 are calculated here. As described above, since the direction of movement is known and the starting coordinates of the adjacent sectors are known, a location of the adjacent sectors not overlapping the initial footprint can be calculated. The method then advances to operation 208 where a second group of pixels corresponding to the adjacent and non-overlapping sector is filled. Referring back to FIGS. 4A and 4B, the pixels defined by sector 146 would be filled here. Thus, only pixels that have not been filled are defined by the adjacent sector. It should be appreciated that since the initial footprint region and the sector are adjacent without overlapping, the processing time is not wasted on writing over a previously written pixel.

Figure 10:
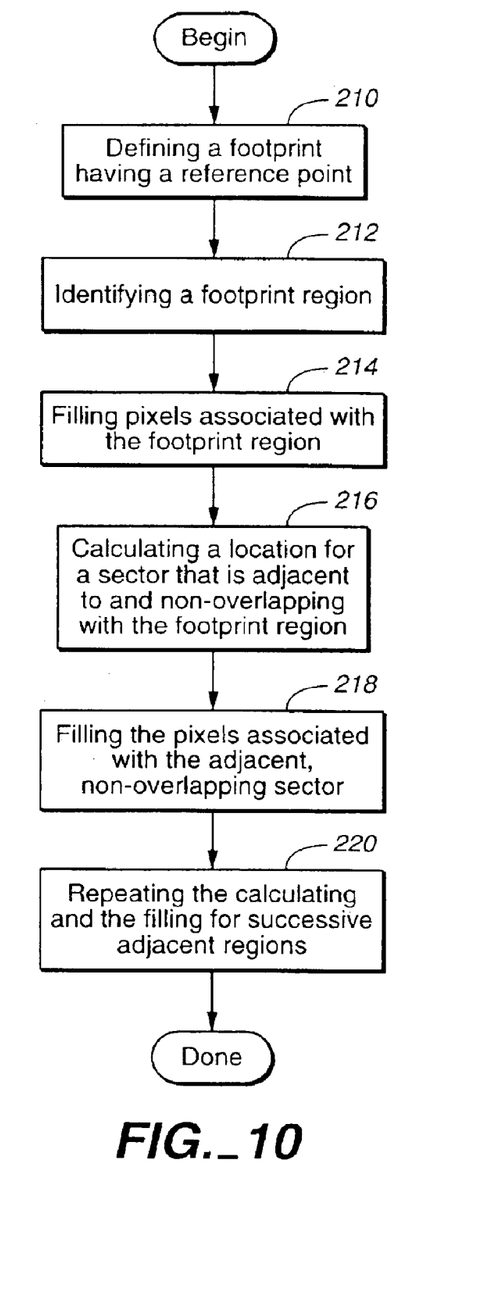
FIG. 10 is a flowchart diagram of the method operations for filling a computer generated display having defined starting coordinates in accordance with one embodiment of the invention.

FIG. 10 is a flowchart diagram of the method operations for a method to fill a computer generated display having defined starting coordinates in accordance with one embodiment of the invention. The flowchart diagram initiates with operation 210 where a footprint having a reference point is defined. In one embodiment, the footprint has dimensions defined by a pen width. The reference point of the footprint can be any point within the footprint, such as a corner or a center of the footprint. The method then advances to operation 212 where a footprint region associated with a display screen is identified. The footprint region is defined by the footprint when the reference point corresponds to the starting coordinates. For example, in reference to FIGS. 3A and 4A, the footprint defined for each of these figures contains a reference point in the lower left hand corner. The reference point of the footprint is placed at the coordinates defined by the starting coordinates to define the footprint region. It will be apparent to one skilled in the art that the starting coordinates are provided by the CPU. As mentioned above, any point within the footprint can be used as a reference point as long as that point is consistently used as the reference point.

The method of FIG. 10 then proceeds to operation 214, where the pixels of the footprint regions are filled. Thus, the pixels contained within the region defined by the footprint of FIGS. 3A, 3B, 4A and 4B would be filled here. The method then moves to operation 216 where a location for a sector that is adjacent to the footprint region is calculated. Here, the adjacent sector does not overlap the footprint region. In one embodiment, a direction of movement is determined when calculating a location for an adjacent sector. One skilled in the art will appreciate that where the Bresenham circle algorithm is applied, the curve can be drawn in any of the octants of a circle. That is, the symmetry of a circle allows for the curve having a radius of the circle to be calculated for one octant of the circle and then, through addition or subtraction of the x and y coordinates, any direction of movement of the arc or curve can be displayed. The method then advances to operation 218 where the pixels of the adjacent sector are filled. Here, previously written pixels are not overwritten, thereby allowing for more efficient processing. The method then proceeds to operation 220 where the calculating and the filling of the pixels for each successive adjacent sector is repeated until the entire image is displayed. In one embodiment, the image is displayed on a LCD screen of a handheld device.

Table 2, below, includes illustrative code for filling an image of an arc or a curve on a display screen in accordance with one embodiment of the invention. Of course, the code can take on any form, so long as the filling function is performed in an adjacent and non-overlapping manner. It should be appreciated that the code defined in Table 2 may have to be adapted to be integrated with a particular operating system of a device incorporating the code. However, the functionality defined by the code i.e., defining successive adjacent and non-overlapping sectors to be filled for a computer generated image, remains the same irrespective of the operating system.

TABLE 2

```
int      [8:0] x, y, radius;
int      [20:0] memaddress;
int      [10:0] deltaB;
int      [11:0] d, deltaSE;
int      DrawRoundedRectangle (int Radius,      // Radius in terms of pixels
                               int CentreX,     // Start X location in the centre of the rounded
                                                //   rectangle
                               int CentreY,     // Start Y location in the centre of the rounded
                                                //   rectangle
                               int Width,       // Width of rectangle
                               int Height,      // Height of Rectangle
                               int Color,       // Drawn Color
                               int ScreenWidth, // Width of the screen in terms of bytes
                               int PenWidth)    // Width of the drawn line in terms of
                                                //   pixels
{
        X = 0;
        Y = Radius;
        D = 1 - Radius;
        DeltaE = 3;
        DeltaSE = 5 - (2 * Radius);
        HalfWidth = Width / 2;
        HalfHeight = Height / 2;
        LeftX = CentreX - HalfWidth + Radius;
        RightX = CentreX + HalfWidth - Radius;
        TopY = CentreY - HalfHeight + Radius;
        BottomY = CentreY + HalfHeight - Radius;
// draw left line
        DrawLine (CentreX - HalfWidth, TopY, CentreX - HalfWidth, BottomY,
                        PenWidth) ;
// draw right line
        DrawLine (CentreX + HalfWidth, TopY, CentreX + HalfWidth, BottomY,
                        PenWidth) ;
// draw top line
        DrawLine (LeftX, CentreY - HalfHeight, RightX,
                        CentreY - HalfHeight,PenWidth) ;
// draw bottom line
        DrawLine (LeftX, CentreY + HalfHeight, RightX,
                        CentreY + HalfHeight,PenWidth) ;
// on first time draw a full rectangle
        DrawAllOctants (LeftX, RightX, TopY, BottomY, X, Y, Color,PenWidth,
                        ScreenWidth)
                while (Y > X)
                {
                        // Draw Sector 2
                        DrawAllSector2 (LeftX, RightX, TopY, BottomY, X, Y,
                                        Color,PenWidth,ScreenWidth) ;
                        if (D < 0) {        // determine where to place the pixel
                                D = D + DeltaE;
                                DeltaE = DeltaE + 2;
                                DeltaSE + DeltaSE + 2;
                                DrawAllSector1 (LeftX, RightX, TopY, BottomY, X, Y,
                                        Color,PenWidth,ScreenWidth) ;
                                }
                        else
                                {
                                D = D + DeltaSE;
                                DeltaE = DeltaB + 2;
                                DeltaSE = DeltaSE + 4;
                                Y--;                    // move Y pixel down 1
                                DrawAllSector3 (LeftX, RightX, TopY, BottomY, X, Y,
                                        Color,PenWidth,ScreenWidth) ;
                                }
                                X++;            // advance to next x coordinate
                }
        }
int DrawAllSector2 (LeftX, RightX, TopY, BottomY, X, Y, Color,PenWidth,ScreenWidth)
        {
        // Draw all 8 octants of the circle
        // draw octant 1
        DrawLine (RightX + X + PenWidth, TopY - Y, RightX + X + PenWidth,
                        TopY - Y - PenWidth + 1, Color,ScreenWidth);
        // draw octant 2
        DrawLine (RightX + Y, TopY - X - PenWidth, RightX + Y + PenWidth - 1,
                        TopY - X - PenWidth,Color,ScreenWidth);
        // draw octant 3
        DrawLine (RightX + Y, BottomY + RightX + Y + PenWidth - 1,
                        BottomY + Y + PenWidth - 1, Color,ScreenWidth);
        // draw octant 4
```

TABLE 2-continued

```
            DrawLine (RightX + X + PenWidth, BottomY + Y, RightX + X + PenWidth,
                                BottomY + Y + PenWidth − 1, Color,ScreenWidth);
            // draw octant 5
            DrawLine (LeftX − X − PenWidth, BottomY + Y, LeftX − X − PenWidth,
                                BottomY + Y + PenWidth − 1, Color,ScreenWidth);
            // draw octant 6
            DrawLine (LeftX − Y, BottomY + X + PenWidth, LeftX − Y − PenWidth − 1,
                                BottomY + X + PenWidth,Color,ScreenWidth);
            // draw octant 7
            DrawLine (LeftX − Y, TopY − X, LeftX + Y + PenWidth − 1,
                                TopY − X − PenWidth,Color,ScreenWidth);
            // draw octant 8
            DrawLine (LeftX − X − PenWidth, TopY − Y,LeftX − X − PenWidth,
                                TopY − Y − PenWidth + 1, Color,ScreenWidth);
}
int DrawAllSector1 (LeftX, RightX, TopY, BottomY, X, Y, Color, PenWidth, ScreenWidth)
            {
            // Draw all 8 octants of the circle
            // draw octant 1
            DrawPoint (RightX + X + PenWidth, TopY − Y − PenWidth,Color,ScreenWidth)
            // draw octant 2
            DrawPoint (RightX + Y + PenWidth, TopY − X − PenWidth,Color,ScreenWidth)
            // draw octant 3
            DrawPoint (RightX + Y + PenWidth, BottomY + X + PenWidth,Color,ScreenWidth)
            // draw octant 4
            DrawPoint (RightX + X + PenWidth, BottomY + Y + PenWidth,Color,ScreenWidth)
            // draw octant 5
            DrawPoint (LeftX − X − PenWidth, BottomY + Y + PenWidth,Color,ScreenWidth)
            // draw octant 6
            DrawPoint (LeftX − Y − PenWidth, BottomY + X + PenWidth,Color,ScreenWidth)
            // draw octant 7
            DrawPoint (LeftX − Y − PenWidth, BottomY − X − PenWidth,Color,ScreenWidth)
            // draw octant 8
            DrawPoint (LeftX − X − PenWidth, BottomY − Y − PenWidth,Color,ScreenWidth)
            }
int DrawAllSector3 (LeftX, RightX, TopY, BottomY, X, Y, Color,PenWidth,ScreenWidth)
            {
            // Draw all 8 octants of the circle
            // draw octant 1
            DrawLine (RightX + X + 1, TopY − Y + 1, RightX + X + PenWidth,
                                TopY − Y − 1, Color, ScreenWidth) ;
            // draw octant 2
            DrawLine (RightX + Y − 1, TopY − X − 1, RightX + Y − 1,
                                TopY − Y − PenWidth,Color,ScreenWidth);
            // draw octant 3
            DrawLine (RightX + Y − 1, BottomY + X + 1, RightX + Y − 1,
                                BottomY + Y + PenWidth,Color,ScreenWidth);
            // draw octant 4
            DrawLine (RightX + X + 1, BottomY + Y − 1, RightX + X + 1,
                                BottomY + Y − PenWidth,Color,ScreenWidth);
            // draw octant 5
            Drawline (LeftX − X − 1, BottomY + Y − 1, LeftX − X − 1,
                                BottomY + Y − PenWidth,Color,ScreenWidth) ;
            // draw octant 6
            DrawLine (LeftX − Y − 1,BottomY + X + 1,LeftX − Y − 1,
                                BottomY + Y + PenWidth,Color,ScreenWidth) ;
            // draw octant 7
            DrawLine (LeftX − Y + 1,TopY − X − 1,LeftX − Y + 1,
                                TopY − Y − PenWidth,Color,ScreenWidth);
            // draw octant 8
            DrawLine (LeftX − X + 1,TopY − Y + 1,LeftX − X + 1,
                                TopY − Y − 1,Color,ScreenWidth);
}
```

The code defined in Table 2 draw sector 2, which corresponds to sector 160-2 of FIGS. 5A and 5B, each time. Then, the direction of movement is determined through the variable D. That is, if D is less than 0, then sector 1, which corresponds to sector 160-1 of FIGS. 5A and 5B, is drawn. When sector 1 is drawn the direction of movement is one pixel over as illustrated in FIGS. 3A and 3B. If D is not less than 0 then sector 3, which corresponds to sector 160-3 of FIGS. 5A and 5B, is drawn. When sector 3 is drawn the direction of movement is one pixel over and one pixel down as illustrated in FIGS. 4A and 4B. As mentioned above, once the curve is drawn in one octant, the curve can be replicated in any of the other 7 octants through the Bresenham Circle Algorithm, as discussed above with respect to FIG. 2.

The code of Table 2 is executed through hardware logic in one embodiment of the invention. One skilled in the art will appreciate that it is possible to synthesize code to generate circuitry for carrying out the logic and the operations of code for efficiently displaying an image, such as the code listed in Table 2. The circuitry carrying out the logic and operations of the code is defined by transistors, logic gates, etc., fabricated on semiconductor chips. Furthermore, the image generation circuitry includes counters, comparators, adders and subtractors to accomplish the mathematical functions in order to define and fill the adjacent, non-overlapping sectors. In order to design the hardware logic, Table 3 below provides an exemplary listing of the register sizes for each variable for one embodiment of the invention. It should be appreciated that Table 3 is listed for exemplary purposes only and not meant to be limiting, as the register sizes will change depending on the width and length of the image.

TABLE 3

| Variable name | Register Size (bits) |
|---|---|
| x | 10 |
| y | 10 |
| D | |
| deltaE | 11 |
| deltaSE | 12 |
| radius | 10 |
| color | 16 |
| memaddress | 21 |

It should be appreciated that the method and apparatus for filling a screen described above can also be accomplished by drawing the pixels for a line of the curve. That is, the footprint is defined and the reference point is moved along a line of the curve through a suitable pen moving algorithm. At each point along the line the reference point corresponds to a pixel which is drawn. Once one line is completed the radius is increased and the footprint is moved along the curve defined by the increased radius, drawing pixels at each point. This is repeated until the width of the curve is filled.

The above described invention may be practiced with other computer system configurations including hand-held devices, microprocessor systems, microprocessor-based or programmable consumer electronics, minicomputers, mainframe computers and the like. While the invention has been described in relation to the embedded systems of handheld devices, it should be appreciated that the invention may also be used with desktop and laptop computing systems.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the invention has been described in some detail for purposes of clarity of understanding, it will be apparent from the foregoing description that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A display controller, the controller comprising:
 image generation circuitry configured to generate an address and a color for each pixel of an image to be drawn on a display screen, the image generation circuitry including:
  pen width selection circuitry configured to identify an initial footprint of the image on the display screen to be drawn, the pen width selection circuitry further configured to define an overlapping footprint to the initial footprint, wherein the pen width selection circuitry identifies within the overlapping footprint a sector to be drawn, the sector being adjacent and non-overlapping to the initial footprint; and
 data processing and selection circuitry configured to interface with a central processing unit (CPU) and a memory, the data processing and selection circuitry in communication with the image generation circuitry and configured to receive the address and the color for each pixel of the image.

2. The display controller of claim 1, further including:
 control block circuitry in communication with the image generation circuitry and the data processing and selection circuitry, the control block circuitry configured to manage signals between the image generation circuitry and the data processing and selection circuitry.

3. The display controller of claim 1, wherein the pen width selection circuitry includes adders, subtractors, counters and comparators.

4. The display controller of claim 1, wherein the data processing and selection circuitry is configured to allow data to be read from a destination before writing to the destination.

5. The display controller of claim 1, wherein the pen width selection circuitry defines a pen width for each footprint, each footprint defining a region of pixels to be drawn.

6. The display controller of claim 1, wherein the display controller is a component of an embedded system.

7. The display controller of claim 6, wherein the embedded system controls a portable handheld electronic device.

8. A device configured to display an image, the device comprising:
 a central processing unit (CPU);
 a random access memory (RAM); and
 drawing engine circuitry in communication with the CPU and the RAM, the drawing engine circuitry including:
  data processing and selection circuitry; and
  image generation circuitry in communication with the data processing and selection circuitry, the image generation circuitry including pen width selection circuitry, the pen width selection circuitry enabling drawing of an image by identifying an initial footprint of the image to be drawn, the pen width selection circuitry further configured to define an overlapping footprint to the initial footprint, wherein the pen width selection circuitry identifies within the overlapping footprint a sector to be drawn, the sector being adjacent and non-overlapping to the initial footprint.

9. The device of claim 8, wherein the pen width selection circuitry defines a pen width for each footprint, each footprint defining a region of pixels to be drawn.

10. The device of claim 8, wherein the pen width selection circuitry is configured to determine a direction of movement for the through the Bresenham circle algorithm.

11. The device of claim 8, wherein the drawing engine circuitry further includes:

control block circuitry in communication with the image generation circuitry and the data processing and selection circuitry, the control block circuitry configured to manage signals between the image generation circuitry and the data processing and selection circuitry.

12. The device of claim 8, wherein the data processing and selection circuitry is configured to allow data to be read from a destination before writing to the destination.

13. The device of claim 8, wherein the image is displayed on a liquid crystal display (LCD) screen.

14. The device of claim 8, wherein the drawing engine circuitry is a component of a liquid crystal display (LCD) controller.

15. A method for drawing a computer generated image on a display screen, the method comprising:

defining a footprint region corresponding to a first group of pixels;

filling the first group of pixels;

determining a direction of movement of an image to be presented on a display screen;

defining a next footprint region in the direction of movement partially overlapping the footprint region;

calculating a location within the next footprint region for an adjacent and non-overlapping sector to the footprint region; and filling a second group of pixels corresponding to the adjacent and non-overlapping sector to the footprint region.

16. The method of claim 15, wherein the method operation of determining a direction of movement of an image to be presented on a display screen further includes:

applying a Bresenham circle algorithm to define points on a curve.

17. The method of claim 15, wherein the computer generated image is a rounded rectangle.

18. The method of claim 15, wherein dimensions of the footprint region are defined by a pen width.

19. The method of claim 15, wherein the method operation of defining a footprint region corresponding to a first group of pixels further includes:

projecting a footprint to define the footprint region, such that a reference point of the footprint region corresponds to starting coordinates of the computer generated image on the display screen.

20. The method of claim 15, wherein the method operation of calculating a location within the next footprint region for an adjacent and non-overlapping sector to the footprint region further includes:

providing a color and an address for each pixel defined by the adjacent and non-overlapping sector.

21. The method of claim 15, wherein the adjacent, non-overlapping sector is one pixel wide.

22. The method of claim 15, wherein the computer generated image is a rounded rectangle.

23. A method for filling a computer generated image on a display screen having defined starting coordinates, the method comprising:

defining a footprint having a reference point;

identifying a footprint region on a display screen, the footprint region defined by the footprint when the reference point corresponds to starting coordinates of an image;

filling pixels associated with the footprint region;

defining a next footprint region overlapping the footprint;

calculating a location for a sector within the next footprint region that is adjacent to and non-overlapping with the footprint region;

filling pixels associated with the adjacent sector; and repeating the operations of calculating a location for a sector within the next footprint region that is adjacent to and non-overlapping with the footprint region and filling pixels associated with the adjacent sector for successive sectors to define the image.

24. The method of claim 23, wherein the method operation of calculating a location for a sector within the next footprint region that is adjacent to and non-overlapping with the footprint region further includes:

determining a direction of movement from the starting coordinates; and providing a color and an address for each pixel defined by the adjacent and non-overlapping sector.

25. The method of claim 24, wherein the method operation of determining a direction of movement from the starting coordinates further includes:

applying a Bresenham circle algorithm to draw the computer generated image, wherein the computer generated image is an arc.

26. The method of claim 23, wherein dimensions of the footprint are defined by a pen width.

27. The method of claim 26, wherein the footprint is a square.

28. The method of claim 27, wherein the reference point is defined by a point located within a corner of the square.

29. The method of claim 23, wherein the sector is one pixel wide.

30. The method of claim 23, further including:

displaying the image on a display screen.

31. The method of claim 30, wherein the display screen is a liquid crystal display screen.

32. The method of claim 23, wherein the computer generated image is a rounded rectangle.

* * * * *

UNITED STATES PATENT AND TRADEMARK OFFICE
CERTIFICATE OF CORRECTION

| | | |
|---|---|---|
| PATENT NO. | : 7,006,094 B2 | Page 1 of 1 |
| APPLICATION NO. | : 10/128905 | |
| DATED | : February 28, 2006 | |
| INVENTOR(S) | : Keith Kejser et al. | |

It is certified that error appears in the above-identified patent and that said Letters Patent is hereby corrected as shown below:

<u>Column 17.</u>

Line 10, please insert --sector-- after "for the".

Signed and Sealed this

First Day of August, 2006

JON W. DUDAS
*Director of the United States Patent and Trademark Office*